United States Patent
Shin (10) Patent No.: US 7,487,676 B2
(45) Date of Patent: Feb. 10, 2009

(54) METHOD OF AND APPARATUS FOR MEASURING A LEVEL OF LIQUID IN A RESERVOIR, AND APPARATUS FOR FORMING A LAYER ON A SUBSTRATE COMPRISING A LIQUID LEVEL DETECTOR

(75) Inventor: Hee-Seok Shin, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 330 days.

(21) Appl. No.: 11/368,430

(22) Filed: Mar. 7, 2006

(65) Prior Publication Data

US 2006/0207313 A1 Sep. 21, 2006

(30) Foreign Application Priority Data

Mar. 15, 2005 (KR) ............... 10-2005-0021201

(51) Int. Cl.
*G01F 23/00* (2006.01)
(52) U.S. Cl. ............... 73/290 R; 73/299; 73/292; 73/304 R
(58) Field of Classification Search ............... 73/290 R, 73/299, 292, 304 R
See application file for complete search history.

(56) References Cited

U.S. PATENT DOCUMENTS

| | | | |
|---|---|---|---|
| 5,249,463 A * | 10/1993 | Willson et al. ............ 73/290 R |
| 5,507,326 A * | 4/1996 | Cadman et al. ............ 141/198 |
| 6,155,540 A | 12/2000 | Takamatsu et al. |
| 6,185,268 B1 * | 2/2001 | Tahira et al. ............... 376/283 |
| 6,467,343 B1 * | 10/2002 | Baird ............... 73/323 |
| 6,539,796 B2 * | 4/2003 | Shirai et al. ............... 73/299 |
| 6,776,038 B1 * | 8/2004 | Horton et al. ............... 73/299 |
| 6,837,263 B2 * | 1/2005 | Kramer ............... 137/414 |
| 6,932,028 B1 * | 8/2005 | Hatfield et al. ............... 122/508 |
| 2005/0189275 A1 * | 9/2005 | Stewart ............... 210/86 |

FOREIGN PATENT DOCUMENTS

| JP | 10-277456 | 10/1998 |
|---|---|---|
| KR | 10-0219762 | 6/1999 |
| KR | 1020040020422 A | 3/2004 |

* cited by examiner

*Primary Examiner*—Hezron Williams
*Assistant Examiner*—Gunnar J Gissel
(74) *Attorney, Agent, or Firm*—Volentine & Whitt, PLLC (57) ABSTRACT

A method of and apparatus for measuring a level of a liquid stored under pressure in a reservoir ensure that the level is measured precisely even when a carrier gas is bubbled through the liquid. A tube extends in the reservoir such that a lower end of the tube is immersed in the liquid and that the liquid occupies a portion of the tube, and a first gas that is insoluble in the liquid is sealed in the upper portion of the tube. A detecting unit detects changes in density of the insoluble gas as the level of the liquid changes. The apparatus is employed in a deposition apparatus where the liquid is used to produce a source gas for forming a layer on a substrate. A carrier gas, bubbled through the liquid in the reservoir, transports gas produced from the liquid to a process chamber in which the deposition process takes place.

14 Claims, 5 Drawing Sheets

METHOD OF AND APPARATUS FOR MEASURING A LEVEL OF LIQUID IN A RESERVOIR, AND APPARATUS FOR FORMING A LAYER ON A SUBSTRATE COMPRISING A LIQUID LEVEL DETECTOR

BACKGROUND OF THE INVENTION

1. Field of the Invention

The present invention relates to a method of and an apparatus for measuring a level of a liquid in a vessel. The present invention also relates to an apparatus for manufacturing a semiconductor device. More particularly, the present invention relate to a method of and an apparatus for measuring a level of a liquid that is converted to a gas used in the manufacturing of a semiconductor device.

2. Description of the Related Art

In general, a semiconductor device is manufactured by performing and repeating several individual processes on a substrate to form a series of patterns on the substrate. These processes include a deposition process, a photolithography process, an etching process, a chemical mechanical polishing (CMP) process, a washing process, and a drying process. The deposition process is performed to form a layer on the substrate. The photolithography and etching processes are performed to pattern the layer, e.g., to form a line type of pattern comprising a series of lines and/or a contact type of pattern comprising a series of contact holes. The deposition process increases in importance as the smaller the critical dimension of, for example, the lines of the line type of pattern to be formed on the substrate becomes and/or the higher the aspect ratio of, for example, the contact holes of the contact type of pattern becomes.

Methods of forming the layer on the substrate of the semiconductor device generally include chemical vapor deposition (CVD), low pressure chemical vapor deposition (LPCVD), plasma enhanced chemical vapor deposition (PECVD), and metal organic chemical vapor deposition (MOCVD). Additionally, a cyclic chemical deposition (CCVD) process, a digital chemical vapor deposition (DCVD) process, and an advanced chemical vapor deposition (ACVD) process can be employed for forming a layer on the substrate.

The above-mentioned methods of forming a layer on a substrate all employ a gas to provide an element of the material of the layer. This gas and a reactant such as a metal organic precursor or a metal halide are supplied to the substrate as source gases. In order to minimize impurities in the layer, an organic ligand or a halide respectively coupled with a metal element in the reactant on the substrate is removed by decomposition in the chemical vapor deposition process, and is removed by chemical exchange in the atomic layer deposition process. That is, in chemical vapor deposition, the source gases are mixed in a process chamber and are supplied onto a surface of a substrate disposed in the chamber. On the other hand, in atomic layer deposition, the source gases are not mixed in the process chamber. Rather, the source gases are supplied in respective pulses onto the substrate. For example, first, only a first source gas is supplied into the process chamber to thereby be chemically absorbed on the substrate. Then a second source gas is supplied into the process chamber to thereby be chemically coupled on the substrate. Generally, a liquid is evaporated to produce the source gas, and the source gas is supplied into the process chamber using a carrier gas.

U.S. Pat. No. 6,155,540 (issued to Hwang et al.) discloses an apparatus that evaporates a liquid and supplies the vapors as a source gas in a chemical vapor deposition process. In this apparatus, the liquid is fed to a vaporizer at a rate controlled by the apparatus, is atomized by an ultrasonic atomizing device, and is evaporated by a heated carrier gas in the vaporizer.

In another known type of method of producing source gas from a liquid, the liquid is stored in a canister and the heated carrier gas is bubbled through the reservoir of the liquid. In this method, the canister is replaced after a predetermined amount of the liquid is used up. More specifically, a level of the liquid in the canister is measured by a liquid level detector. The canister is replaced once the liquid drops below a predetermined level in the canister.

One way for measuring the level of a liquid stored in a vessel is to detect the change in pressure in the vessel as the liquid evaporates. Korean Laid-Open Patent Publication No. 1999-32720 discloses an apparatus of this type for measuring the amount of fuel stored in a vessel. An advantage of this apparatus is that the amount of liquid can be measured precisely irrespective of a shape of the vessel.

Figure 1:
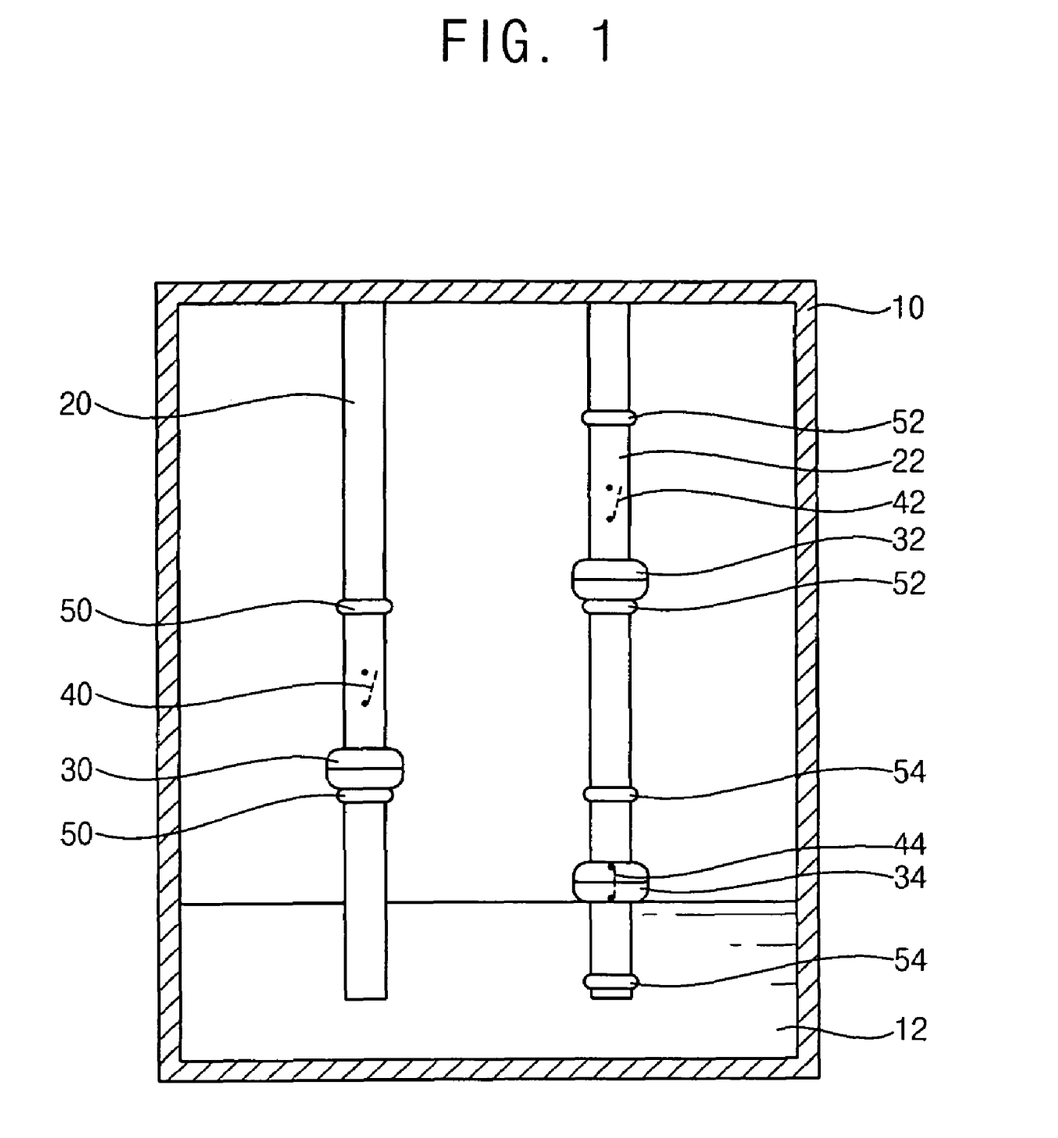
FIG. 1 is a schematic cross-sectional view of a conventional apparatus for measuring a level of a liquid.

FIG. 1 is a schematic cross-sectional view of a conventional apparatus for measuring a level of a liquid stored in a vessel. Referring to FIG. 1, the apparatus comprises a first guide pole 20 and a second guide pole 22 each extending from an upper surface of a vessel 10 in a direction substantially perpendicular to a bottom of the vessel 10. The liquid 12 stored in the vessel 10 is, for example, 3-methylaluminum.

A first float 30 is disposed around the first guide pole 20 and is supported so as to be movable up-and-down along the first guide pole 20. The first float 30 can float on a surface of a liquid 12 and thus assume a position corresponding to the level of the liquid 12. However, a range over which the first float 30 can move along the first guide pole 20 is restricted by a pair of first stoppers 50 attached to an outer surface of the first guide pole 20 at a central portion thereof. In addition, the first float 30 comprises a first magnet (not shown). A first magnetic sensor 40 is disposed inside a central portion of the first guide pole 20 midway between the stoppers 50 so as to sense an arrival of the first magnet at a middle portion of the vessel 10.

A second float 32 and a third float 34 are disposed along the second guide pole 22, and are supported so as to be movable up-and-down along the second guide pole 22. The second and third floats 32 and 34 can float on the surface of the liquid 12 and thus assume positions according to the level of the liquid 12. However, a range over which the second float 32 can move along the second guide pole 22 is restricted by a pair of second stoppers 52 attached to an outer surface of the second guide pole 22 at an upper portion thereof. In addition, the second float 32 comprises a second magnet (not shown), and a second magnetic sensor 42 is disposed inside the upper portion of the second guide pole 22 midway between second stoppers 52 so as to sense an arrival of the second magnet at an upper portion of the vessel 10. Similarly, a range over which the third float 34 can move along the second guide pole 22 is restricted by a pair of third stoppers 54 attached to an outer surface of the second guide pole 22 at a lower portion thereof. The third float 34 comprises a third magnet (not shown), and a third magnetic sensor 44 is disposed inside the second guide pole 22 midway between third stoppers 54 so as to sense an arrival of the third magnet at a lower portion of the vessel 10. Thus, the second magnetic sensor 42 detects a state in which the level of liquid 12 in the vessel 10 is high, the first magnetic sensor 40 detects a state in which the level of liquid 12 is at a middle portion of the vessel 10, and the third magnetic sensor 44 detects a state in which the level of the liquid 12 in the vessel 10 is low.

However, a spacing between the above-mentioned sensors 40, 42, and 44 is relatively wide. Thus, there are some points where the level of the liquid 12 may not be detected. Additionally, the floats 30, 32, and 34 can be moved by the bubbling of the liquid 12 when the liquid is converted to a source gas. In that case, the level of the liquid 12 may not be detected precisely. Additionally, the above-mentioned magnetic sensors 40, 42, and 44 may malfunction, in which case the magnetic sensors 40, 42, and 44 do not detect a state in which the liquid 12 is depleted. If this occurs and the vessel 10 is not replaced, the deposition process will fail. Thus, it is difficult to manage an operation of replacing the reservoir 10 when a liquid level measuring apparatus of the type shown in FIG. 1 is employed.

SUMMARY OF THE INVENTION

An object of the present invention is to provide a method by which a level of liquid in a reservoir can be precisely measured.

Similarly, another object of the present invention is to provide an apparatus that precisely measures a level of liquid in a reservoir.

Still another object of the present invention is to provide an apparatus for forming a layer on a substrate using a source gas produced from liquid stored in a reservoir, wherein a level of the liquid in the reservoir can be measured precisely, even while a carrier gas is being bubbled through the liquid, to prevent the deposition process from failing.

According to one aspect of the present invention, there is provided a method of measuring a level of liquid stored under pressure in a reservoir, which comprises sealing a first gas in an upper portion of a tube whose lower end is open and immersed in the liquid, detecting changes in density of the first gas in the upper portion of the tube as the level of the liquid in the reservoir changes, and determining the level of the liquid in the reservoir based on the changes in density of the first gas. Preferably, the first gas is insoluble in the liquid. Also, a second gas produced from the liquid can also occupy an upper end of the tube with the first gas. The level of the liquid may be determined by correlating densities of the first gas in the upper portion of the tube to different levels of the liquid in the reservoir, and calculating the level using the correlation of the densities of the first gas in the upper portion of the tube to various levels of the liquid in the reservoir.

According to another aspect of the present invention, there is provided a combination of a reservoir in which liquid is stored under pressure, and apparatus for measuring a level of the liquid in the reservoir, wherein the apparatus comprises a tube extending downwardly in the reservoir, a first gas sealed in an upper portion of the tube, and a detecting unit including a sensor operative to measure the density of gas in the tube. The tube has an open lower end immersed in the liquid in the reservoir such that the liquid occupies a lower portion of the tube. A bottom of the reservoir may have a groove therein in which some of the liquid remains when the reservoir is nearly empty. In this case, the tube extends into the groove so that the gas inside the tube does not flow out of the lower end of the tube when the liquid in the reservoir is basically depleted.

The detecting unit detects changes in density of the first gas inside the upper portion of the tube as the level of the liquid in the reservoir changes, and outputs signals representing the changes in density. The apparatus for measuring the level of the liquid may further include a calculating unit that calculates the level of the liquid in the reservoir using the signals representative of the changes in density of the first fluid and output by the detecting unit. The apparatus may also include a display unit that displays the level of the liquid in the reservoir. An alarm unit may be provided to generate an alarm signal when the level of the liquid as determined by the calculating unit falls outside an endpoint of a predetermined range.

According to still another aspect of the present invention, there is provided an apparatus for forming a layer on a substrate, the apparatus comprising a process chamber, a reservoir connected to the process chamber and in which liquid is stored under pressure, a carrier gas supply unit connected to the reservoir, a tube extending in the reservoir, a first gas sealed in an upper portion of the tube, and a detecting unit that detects changes in density of the first gas inside the upper portion of the tube. The tube has an open lower end immersed in the liquid in the reservoir such that the liquid occupies a lower portion of the tube. Preferably, the first gas is insoluble in the liquid and remains sealed in the tube by the liquid that enters the tube from the lower end thereof. A carrier gas is supplied into the liquid in the reservoir carrier by the gas supply unit. The carrier gas bubbles the liquid and transports gas produced from the liquid to the process chamber.

According to the present invention, the level of the liquid in the reservoir is measured by detecting the density of the first gas inside the tube. Therefore, the level of the liquid can be precisely measured despite the bubbling of the liquid in the reservoir.

BRIEF DESCRIPTION OF THE DRAWINGS

The above and other objects, features and advantages of the present invention will become more apparent by informing the following detailed description of the preferred embodiments thereof made with reference to the accompanying drawings, in which.

DETAILED DESCRIPTION OF THE PREFERRED EMBODIMENTS

The present invention will now be described more fully hereinafter with reference to the accompanying drawings.

Figure 2:
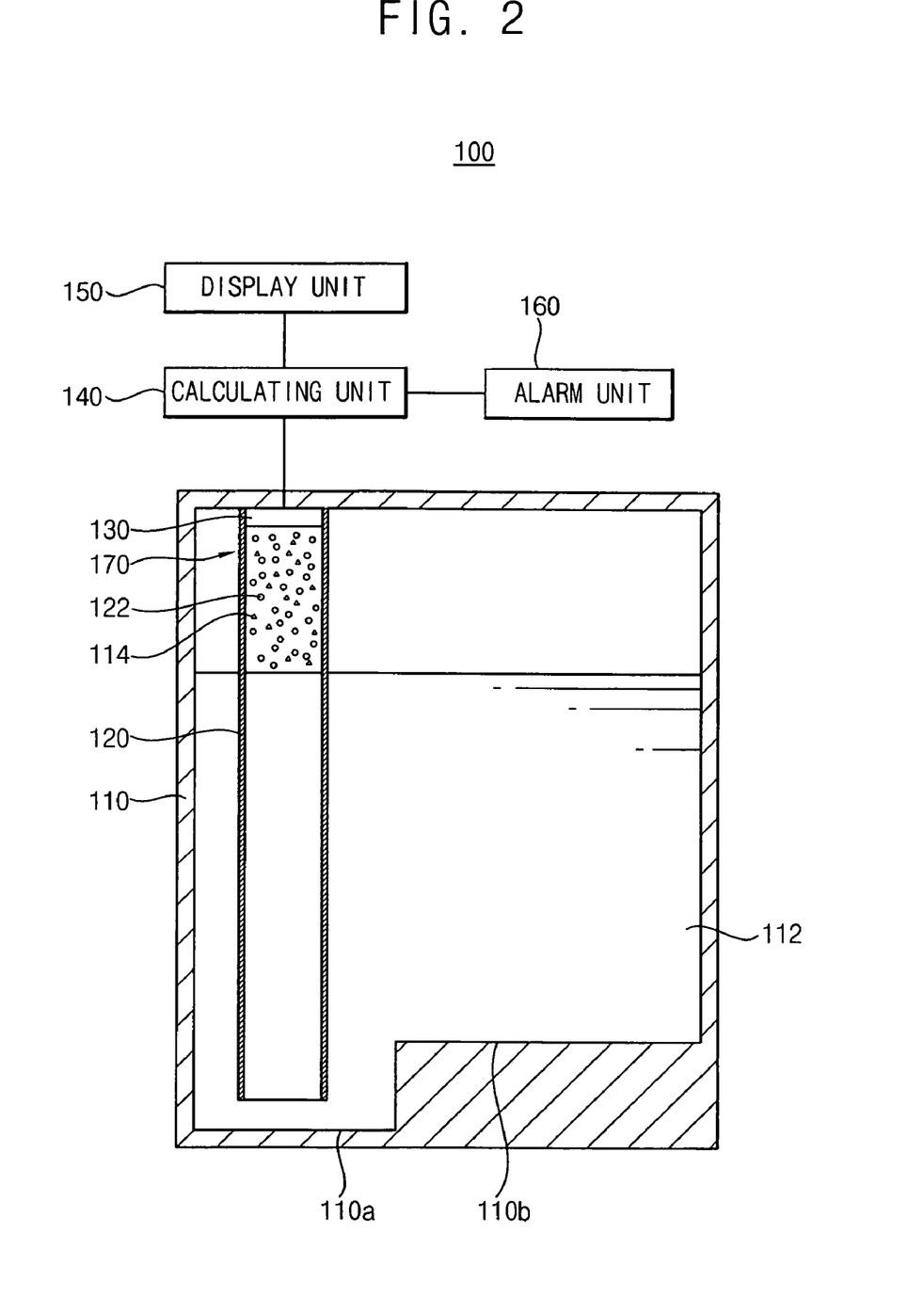
FIG. 2 is a cross-sectional view of a source of liquid including a vessel and an apparatus for measuring the level of liquid in the vessel in accordance with the present invention.
Figure 3:
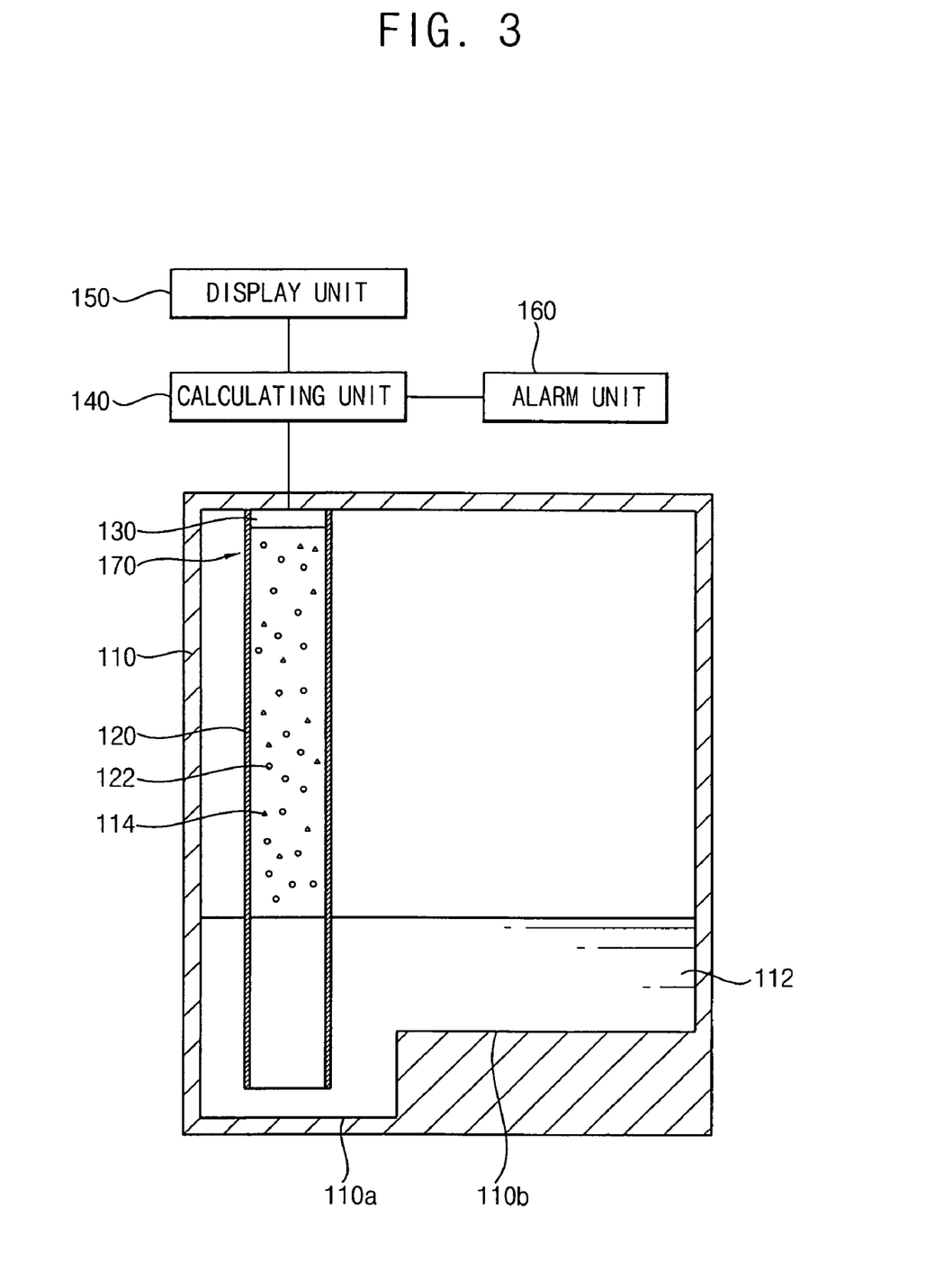
FIG. 3 is a view similar to that of FIG. 2 but showing a state in which the level of the liquid in the vessel is lower.

FIG. 2 is a cross-sectional view of a source of liquid including a vessel and an apparatus for measuring the level of liquid in the vessel in accordance with the present invention. FIG. 3 is a view similar to that of FIG. 2 but showing a state in which the level of the liquid in the vessel is lower. Referring to FIGS. 2 and 3, a source 100 of liquid for use in a semiconductor device manufacturing process or the like includes a reservoir 110 in which a liquid 112 is stored, and an apparatus for measuring the level of the liquid 112 in the reservoir 110. The apparatus for measuring the level of the liquid 112 includes a tube 120, a detecting unit 130, a calculating unit 140, a display unit 150, and an alarm unit 160.

The reservoir 110 may be hexahedral or cylindrical to accommodate the liquid 112 therein. A carrier gas supply line (not shown) is connected to the reservoir 110 so as to bubble the liquid source 112 stored in the reservoir 110. Additionally, a source gas supply line (not shown in the figure) is connected to the reservoir 110. The source gas supply line is connected to a process chamber so that a source gas, produced by heating the liquid 112 with a carrier gas, can be supplied into the process chamber. To this end, an interior of the reservoir 110 may be under a predetermined pressure that acts to feed the source gas into the process chamber at a constant rate.

A groove is formed in a bottom of the reservoir 110. Thus, the bottom of the reservoir 110 is stepped. That is, the bottom of the reservoir 110 includes an upper portion 110b and a lower portion 110a (defining the groove). Also, a heater may be disposed under the reservoir 110 to heat the liquid 112 stored in the reservoir 110.

The liquid 112 stored in the reservoir 110 may serve as a source of gas for a deposition process of forming a layer on a substrate in the process chamber. Thus, the liquid 112 may include a metal organic compound. In this case, the liquid 112 is bubbled and then supplied into the process chamber.

The tube 120 extends from an inner upper surface of the reservoir 110 toward the bottom of the reservoir 110. The tube 120 may extend longitudinally in the reservoir 110 in a direction substantially perpendicular to a surface of the liquid 112. Part of the tube 120 is immersed in the liquid 112. An upper end of the tube 120 is closed and a bottom of the tube 120 is open.

Also, the tube 120 projects into the groove that is defined by the lower portion 110a of the bottom of the reservoir 110. Thus, the lower end of the tube 120 remains immersed in the liquid 112 within the groove even if the level of the liquid 112 drops to the bottom of the reservoir 110. The tube 120 is thus sealed by the liquid 112. More specifically, a first gas 122 is sealed within the tube 120 by the liquid 112. The first gas 122 is one that is insoluble in the liquid 112. Accordingly, the first gas is prevented from leaking out of the tube 120 through the lower end of the tube 120. Additionally, a second gas 114, namely vapors of the liquid 112, is introduced into the tube 120.

As the level of the liquid 112 in the reservoir 110 changes, difference between a pressure within the tube 120 and a pressure in the reservoir 110 outside the tube 120 changes because the tube 120 is sealed as described above. At this time, the level of the liquid 120 in the reservoir 110 outside the tube 120 differs temporarily from the level of the liquid 120. Then, the liquid 112 evaporates or the second gas 114 condenses until the pressure within the tube 120 becomes substantially identical to the pressure in the reservoir 110 outside the tube 120. Once the pressure equilibrates, the level of the liquid 112 in the reservoir 110 becomes substantially equal to that of the liquid 112 inside the tube 120. Accordingly, a volume of gas sealed in the tube 120 changes with changes in the level of the liquid 112. Although a mass of the first gas 122 in the tube 120 remains constant, density of the first gas 122 changes as the level of the liquid 112 changes because the volume of free space in the tube 120, i.e., space that can be occupied by gas in the sealed tube 120, changes.

As shown in FIG. 2, when the level of the liquid 112 is high, the density of the first gas 122 is relatively high because the volume of free space in the sealed tube 120 is rather small. On the contrary, as shown in FIG. 3, when the level of the liquid 112 is low, the density of the first gas 122 is relatively low because the volume of free space in the sealed tube 120 is rather large.

The detecting unit 130 is disposed at the upper end of the tube 120. The detecting unit 130 comprises any type of known sensor capable of measuring density of a gas. The detecting unit 130 thus detects the density of the first gas 122 inside the tube 120, and outputs a signal representative of a value of the density.

The calculating unit 140 is connected to the detecting unit 130. The calculating unit 140 calculates the level of the liquid 112 in the reservoir 110 based on the density of the first gas 122 measured by the detecting unit 130. More specifically, the calculating unit 140 calculates the level of the liquid 112 using an algorithm or data correlating the level of the liquid 112 and the density of the first gas 122 inside the tube 120.

The display unit 150 is connected to the calculating unit 140. The display unit 150 displays the level of the liquid 112 calculated by the calculating unit 140. The display unit 150 may comprise a digital or analog display for displaying the level of the liquid 112.

The alarm unit 160 is connected to the calculating unit 140 to generate alarm signals when the level of the liquid 112 calculated by the calculating unit 140 is outside a predetermined range. The alarm signals may be audio or visual signals that are perceivable by an operator. More specifically, the alarm unit 160 generates a first alarm signal when the level of the liquid 112 in the reservoir 110 exceeds a predetermined first reference level. Additionally, the alarm unit 160 generates a second alarm signal when the level of the liquid 112 in the reservoir 110 is lower than a predetermined second reference level. In the latter case, the second alarm signal indicates that liquid should be supplied into the reservoir 110 or that the reservoir 110 should be replaced.

Figure 4:
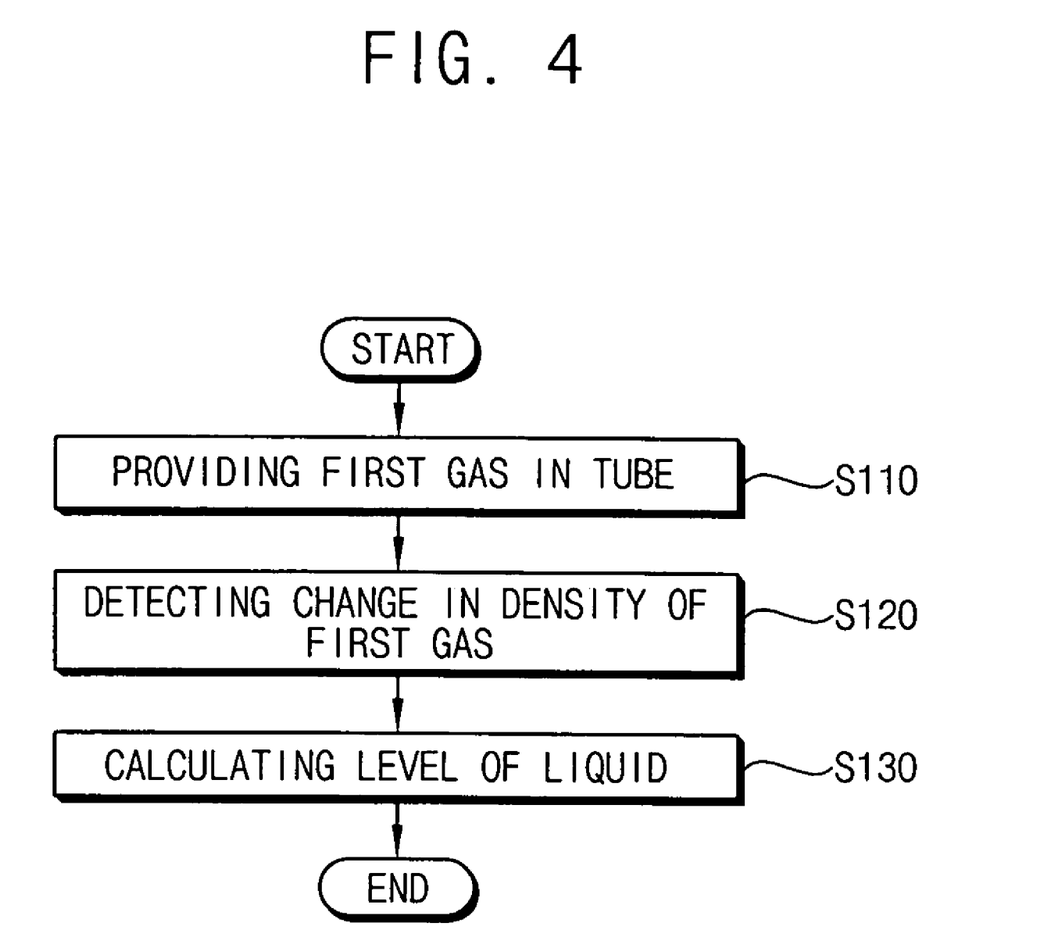
FIG. 4 is a flow chart of a method of measuring the level of a liquid in accordance with the present invention.

FIG. 4 is a flow chart illustrating a method of measuring a level of liquid in a reservoir in accordance with the present invention.

Referring to FIGS. 2 to 4, a predetermined amount (mass) of a first gas 122 is provided in the tube 120 with the lower end of the tube 120 immersed in the liquid 112 in the reservoir 110 such that the lower end of the tube is occupied by the liquid 112 (S110). The first gas 122 is selected so as to be insoluble in the liquid 112 in the reservoir 110, and is supplied into the tube 120 from outside the reservoir 110. Thus, the first gas 122 is sealed in the tube 120. The liquid 112 is stored in the reservoir 110 under a predetermined pressure. Some of the liquid 112 in the tube 120 may evaporate and resulting gas 114 also occupies the space in the tube not occupied by the liquid 112.

For the reasons described above, when the level of the liquid 112 in the reservoir 110 changes, the density of the first gas 122 sealed in the tube 120 changes accordingly. The density of the first gas 122 is measured (S120).

Next, the level of the liquid 112 is calculated (step S130), based on the measurement of the density of the first gas 122, using a relationship between the level of the liquid 112 and the density of the first gas 122. This relationship can be predetermined through actual trial or simulation. Also, the relationship can be reduced to an algorithm or a set of correlated data.

The level of the liquid 112 may be displayed. Also, an alarm may be generated when the calculated level of the liquid falls outside a predetermined range.

Figure 5:
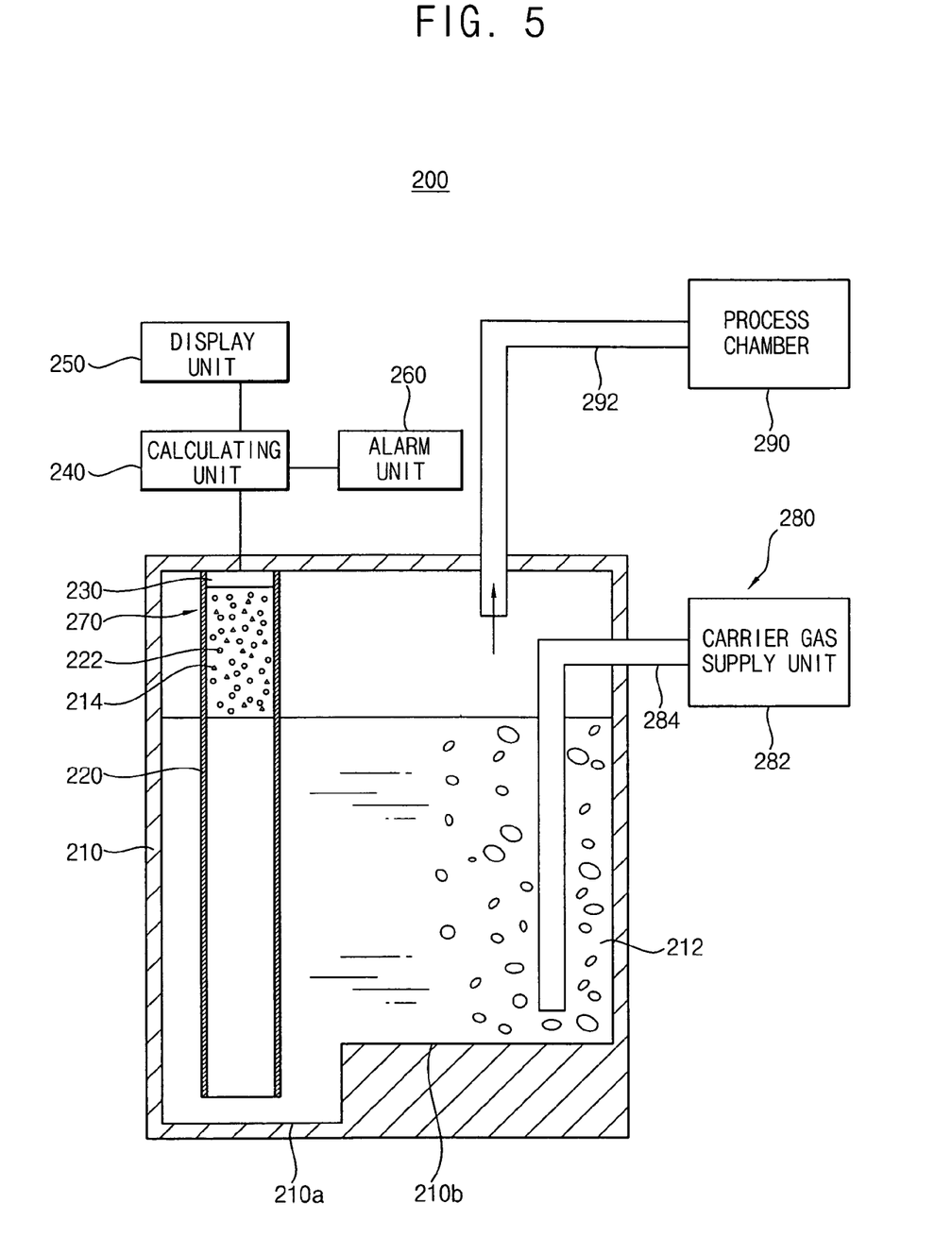
FIG. 5 is a cross-sectional view of an apparatus for forming a layer on a substrate in accordance with the present invention.

FIG. 5 illustrates an apparatus for forming a layer on a substrate in accordance with the present invention. Referring to FIG. 5, an apparatus 200 for forming a layer on a substrate comprises a process chamber 290, a reservoir 210, a source gas supply line 292, a carrier gas supply unit 280 that includes a carrier gas supply line 284 and a source of a carrier gas 282, a measuring apparatus 270 for measuring the level of liquid in the reservoir 210.

A process used in manufacturing of the semiconductor device, e.g., a deposition process for forming a layer on a substrate, is performed in the process chamber 290.

The reservoir 210 is cubic or cylindrical, and stores a liquid 212. A groove is formed in a bottom of the reservoir 210. Thus, the bottom of the reservoir 110 is stepped. That is, the bottom of the reservoir 210 includes an upper portion 210b and a lower portion 210a (defining the groove). Also, a heater may be disposed under the reservoir 210 to heat the liquid 212 stored in the reservoir 210.

In a case in which the liquid 212 stored in the reservoir 210 is converted to a source gas of a deposition process performed in the process chamber 290, the liquid 212 may include a metal organic compound. For example, the metal organic compound includes a metal halide or a metal alcoxide. Alternatively, the metal organic compound may include a metal organic precursor having various types of ligand bonds.

The carrier gas supply line 284 is connected to the reservoir 210. More specifically, the carrier gas supply line 284 is connected to the bottom of the reservoir 210. The carrier gas supply line 284 is also connected to the source of carrier gas 282. The carrier gas is supplied from the source 282 thereof into the reservoir 210 through the carrier gas supply line 284 to bubble the liquid 212 in the reservoir 210. Thus, even if the liquid 212 in the reservoir 210 decreases to a low level, the carrier gas will bubble the liquid 212. A flow control valve (not shown) for controlling a flow of the carrier gas is disposed in the carrier gas supply line 284. A coil type of heater may be disposed around the carrier gas supply line 284 to heat the carrier gas flowing through the line. The source gas supply line 292 is connected to the reservoir 210 and the process chamber 290. Thus, a source gas produced from the liquid 212 by the carrier gas is supplied to the process chamber 290 through the source gas supply line 292. The carrier gas may be an inert gas such as nitrogen or argon.

The measuring apparatus 270 for measuring the level of the liquid 212 includes a tube 220 disposed in the reservoir 210, a predetermined amount of a first gas 222 sealed in an upper end of the tube 220, a detecting unit 230, a calculating unit 240, a display unit 250 and an alarm unit 260. The measuring apparatus 270 measures the level of liquid 212 in the same way as described above in connection with FIGS. 2-4, i.e., by measuring the density of the first gas 222 inside the reservoir 220.Thus, an operation of the measuring apparatus 270 will not be described in further detail.

However, the operation of the apparatus 200 for manufacturing the semiconductor device or the like will be described in more detail.

First, the carrier gas is supplied from the carrier gas source 282 to the reservoir 210 through the carrier gas supply line 284. In this case, the carrier gas may be heated by the coil type of heater (not shown) disposed around the carrier gas supply line 284.

Also, the liquid 212 in the reservoir 210 may be heated by the heater disposed under the reservoir 210.

The source gas is formed by bubbling the liquid 212 with the carrier gas. The source gas is supplied to the process chamber 290 through the source gas supply line 292 for use in forming a layer on a semiconductor substrate supported in the process chamber 290.

As the deposition process is carried out and repeated on additional substrates, the level of the liquid 212 gradually decreases in the reservoir. The measuring apparatus 270 monitors the level of the liquid 212 in the reservoir 210. The alarm unit 260 generates an alarm signal when the level of the liquid 212 drops below a predetermined reference level. At that time, new liquid is supplied to the reservoir 210 or the reservoir 210 is replaced.

According to the present invention as described above, an apparatus for measuring the level of liquid in a reservoir includes a tube having a lower end immersed in the liquid, and a gas that is insoluble in the liquid occupying an upper portion of the tube. The apparatus measures the level of the liquid in the reservoir using density of the insoluble gas. Therefore, the level of the liquid in the reservoir may be determined precisely despite the bubbling of the liquid by a carrier gas. Additionally, defects in a process that uses a gas produced from the liquid are prevented because the apparatus is not likely to allow the level of the liquid in the reservoir to fall below a predetermined level without indicating the same.

Finally, although the present invention has been described above in connection with the preferred embodiments thereof, modifications of and changes to the preferred will be apparent to those skilled in the art. Accordingly, such modifications are seen to be within the true spirit and scope of the present invention as defined by the appended claims.

What is claimed is:

1. A method of measuring a level of a liquid disposed under pressure in a reservoir, the method comprising:
   sealing a first gas in an upper portion of a tube, the tube having an open lower end immersed in the liquid;
   detecting changes in density of the first gas in the upper portion of the tube as the level of the liquid in the reservoir changes; and
   determining the level of the liquid in the reservoir based on the changes in density of the first gas,
   wherein the sealing of the first gas in the upper portion of the first tube comprises providing a first gas that is insoluble in the liquid into the tube while the lower end of the tube is immersed in the liquid such that the liquid keeps the first gas within the tube.

2. The method of claim 1, wherein the determining of the level of the liquid comprises correlating densities of the first gas in the upper portion of the tube to different levels of the liquid in the reservoir.

3. The method of claim 2, wherein the determining of the level of the liquid further comprises calculating the level of the liquid using the correlation of the densities of the first gas in the upper portion of the tube to various levels of the liquid in the reservoir.

4. A combination of a reservoir in which liquid is stored under pressure, and apparatus for measuring a level of the liquid in the reservoir, wherein the apparatus comprises:
   a tube extending in the reservoir, the tube having an upper end, and an open lower end immersed in the liquid in the reservoir such that the liquid occupies a portion of the tube;
   a first gas sealed in an upper portion of the tube; and
   a detecting unit disposed at the upper end of the tube, the detecting unit including a sensor operative to measure density of gas, wherein the detecting unit detects changes in density of the first gas inside the upper portion of the tubes,
   wherein the first gas is insoluble in the liquid and is sealed in the tube by and between the liquid in the tube and the detecting unit.

5. The combination of claim 4, wherein a bottom of the reservoir has a groove therein, and the tube extends into the groove.

6. The combination of claim 4, wherein the detecting unit is operative to output signals representative of the changes in the density of the first gas, and further comprising a calculating unit connected to the detecting unit to receive the signals output by the detecting unit, the calculating unit being configured to calculate the level of the liquid in the reservoir based on the signals output by the detecting unit.

7. The combination of claim 6, further comprising a display unit operatively connected to the calculating unit so as to display the level of the liquid calculated by the calculating unit.

8. The combination of claim 6, further comprising an alarm unit operatively connected to the calculating unit so as to generate an alarm signal when the level of the liquid is outside an endpoint of a predetermined range.

9. An apparatus for forming a layer on a substrate, the apparatus comprising:
- a process chamber;
- a reservoir connected to the process chamber, and liquid stored in the reservoir under pressure;
- a carrier gas supply unit including a source of a carrier gas and connected to the reservoir such that the carrier gas is supplied into the liquid in the reservoir, whereby the carrier gas transports gas produced from the liquid to the process chamber;
- a tube extending in the reservoir, the tube having an upper end, and an open lower end immersed in the liquid in the reservoir such that the liquid occupies a portion of the tube;
- a first gas sealed in an upper portion of the tube; and
- a detecting unit disposed at the upper end of the tube, the detecting unit including a sensor operative to measure density of gas, wherein the detecting unit detects changes in density of the first gas inside the upper portion of the tube, wherein the first gas is insoluble in the liquid and is sealed in the upper portion of the tube by and between the liquid in the tube and the detecting unit.

10. The apparatus of claim 9, wherein a bottom of the reservoir has a groove therein, and the tube extends into the groove.

11. The combination of claim 9, wherein the liquid includes a metal organic compound.

12. The apparatus of claim 9, wherein the detecting unit is operative to output signals representative of the changes in the density of the first gas, and further comprising a calculating unit connected to the detecting unit to receive the signals output by the detecting unit, the calculating unit being configured to calculate the level of the liquid in the reservoir based on the signals output by the detecting unit.

13. The apparatus of claim 12, further comprising a display unit operatively connected to the calculating unit so as to display the level of the liquid calculated by the calculating unit.

14. The apparatus of claim 12, further comprising an alarm unit operatively connected to the calculating unit so as to generate an alarm signal when the level of the liquid is outside an endpoint of a predetermined range.

* * * * *